(12) United States Patent
Li et al.

(10) Patent No.: US 8,081,432 B2
(45) Date of Patent: Dec. 20, 2011

(54) FLAT PANEL DISPLAY DEVICE

(75) Inventors: Wei Li, Shenzhen (CN); Hua Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 469 days.

(21) Appl. No.: 12/432,741

(22) Filed: Apr. 29, 2009

(65) Prior Publication Data

US 2010/0084998 A1    Apr. 8, 2010

(30) Foreign Application Priority Data

Oct. 8, 2008  (CN) .......................... 2008 1 0304788

(51) Int. Cl.
  *G06F 1/16* (2006.01)
(52) U.S. Cl. ..................... 361/679.06; 248/42; 248/917; 248/922
(58) Field of Classification Search ................... 318/34; 248/42, 58, 278.1, 917–923; 361/679.06, 361/679.07, 679.21, 697.22, 679.26; 345/728
  See application file for complete search history.

(56) References Cited

U.S. PATENT DOCUMENTS

| | | | | |
|---|---|---|---|---|
| 6,931,596 B2* | 8/2005 | Gutta et al. | .................. | 715/728 |
| 7,296,774 B2* | 11/2007 | Oh | ................................ | 248/324 |
| 2006/0071135 A1* | 4/2006 | Trovato | .................... | 248/289.11 |
| 2006/0171105 A1* | 8/2006 | Hsiao | ............................ | 361/681 |
| 2008/0093528 A1* | 4/2008 | Tsai et al. | ..................... | 248/917 |
| 2009/0071135 A1* | 3/2009 | Evans-Beauchamp | ......... | 60/321 |

* cited by examiner

*Primary Examiner* — Walter Benson
*Assistant Examiner* — Jorge Carrasquillo
(74) *Attorney, Agent, or Firm* — Altis Law Group, Inc.

(57) ABSTRACT

The present disclosure provides a flat panel display device. A flat panel display device includes a display panel, a stand, and a multi-angle adjusting device. The multi-angle adjusting device includes a first shell fixed on the stand, a second shell cooperatively defining a receiving space with the first shell, a holder, a first motor, a second motor, and a third motor. The holder, the first, the second, and the third motors are received in the receiving space. The first motor is connected between the first shell and the holder, and rotates the holder about a first direction along the stand. The second motor is connected between the holder and the second shell, and moves about a second direction perpendicular to the first direction relative to the first shell. The third motor is connected between the second shell and the display panel, and rotates about a third direction which is perpendicular to the first and second directions.

12 Claims, 5 Drawing Sheets

FLAT PANEL DISPLAY DEVICE

BACKGROUND

1. Technical Field

The present disclosure relates to a flat panel display device, in particularly, relates to a flat panel display device having a multi-angle adjustable device.

2. Description of Related Art

Flat panel display device, such as Liquid Crystal Display (LCD) and plasma screen display, has gained increasing popularity over cathode ray tube (CRT) display as the former is less bulky and more portable. Nevertheless, current flat panel display device has its limitations. One notable limitation is that the light intensity of the flat panel display device, which affects the clarity of the visual objects displayed, may vary significantly when viewed from different angles. Consequently, unless the view angle of the flat panel display device can be easily adjusted through the use of a tilt angle stand, its popularity may be limited.

What is needed, therefore, is a flat panel display device which view angle can be adjusted conveniently to overcome the above-described limitations.

BRIEF DESCRIPTION OF THE DRAWINGS

Many aspects of the present flat panel display device can be better understood with reference to the following drawings. The components in the drawings are not necessarily drawn to scale, the emphasis instead being placed upon clearly illustrating the principles of the present flat panel display device.

DETAILED DESCRIPTION

Embodiments of the present disclosure will now be described in detail below, with reference to the accompanying drawings.

Figure 1:
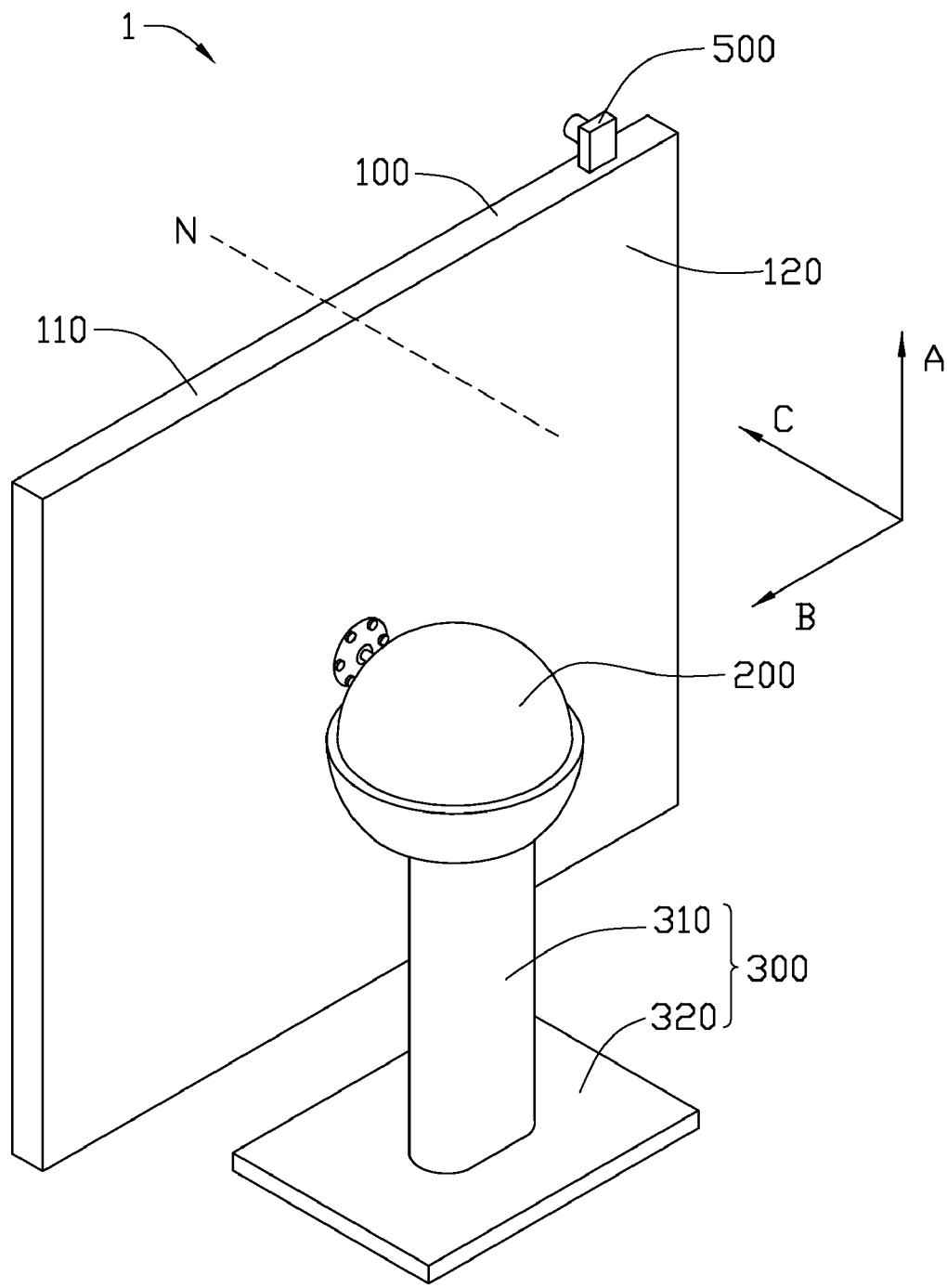
FIG. 1 is a schematic view of a flat panel display device according to an exemplary embodiment.
Figure 2:
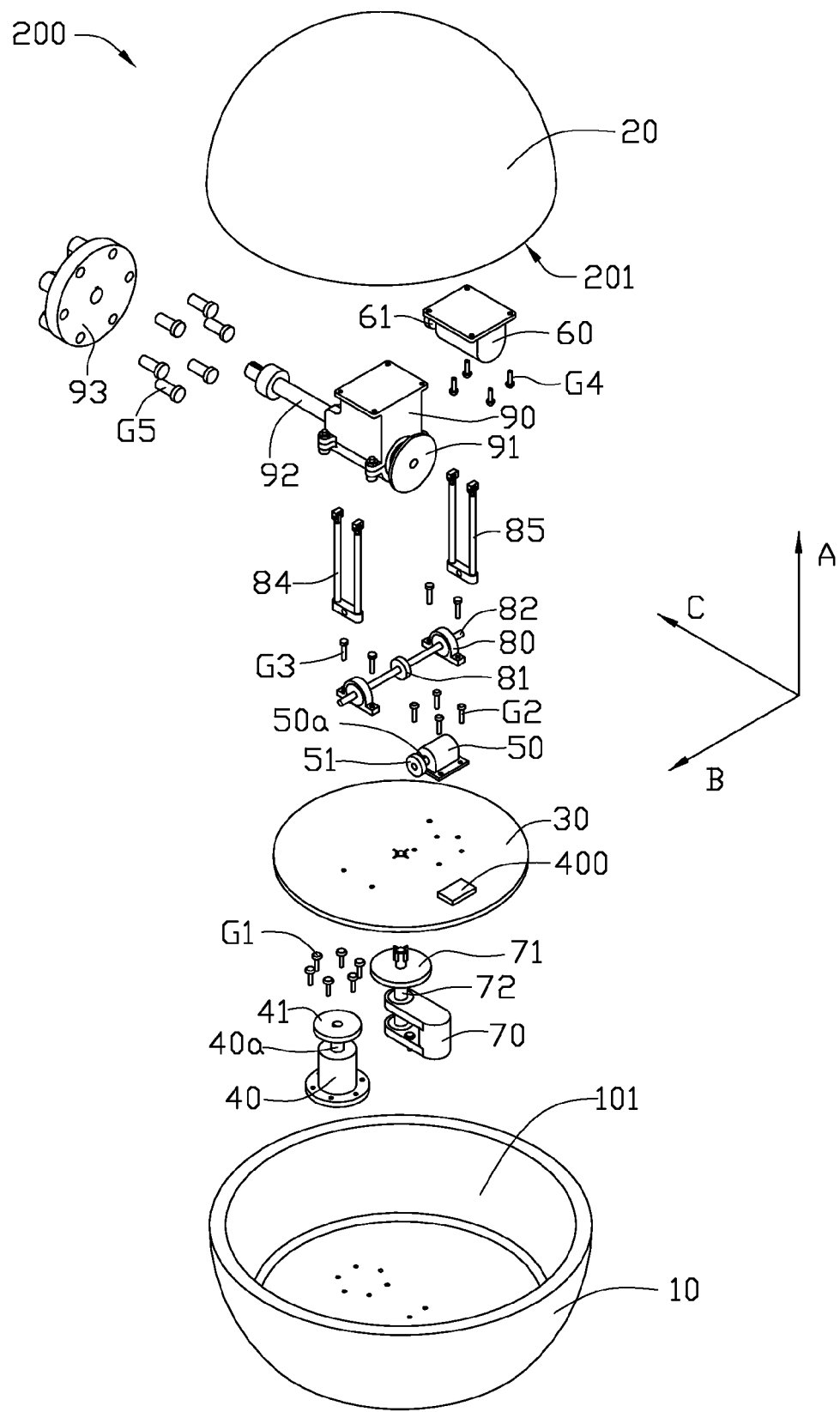
FIG. 2 is a schematic exploded view of a multi-angle adjustable device of the flat panel display device of FIG. 1.

Referring to FIGS. 1 and 2, an exemplary embodiment of a flat panel display device 1 is shown. The flat panel display device 1 can be a LCD monitor, a plasma screen display or other flat screen display. In the present embodiment, the flat panel display device 1 is a LCD monitor. The flat panel display device 1 includes a display panel 100, a multi-angle adjusting device 200, a stand 300, a controller 400, and an image capturing device 500. The display panel 100 connects with the stand 300 via the multi-angle adjusting device 200. In the present embodiment, the stand 300 includes a support 310 and a base 320. One end of the support 310 is connected with the multi-angle adjusting device 200, and another end of the support 310 is connected with the base 320. The base 320 is substantially a flat sheet.

The display panel 100 includes a top surface 110 and a back surface 120. The multi-angle adjusting device 200 is connected to the back surface 120 of the display panel 100. The image capturing device 500 is located on the display panel 100 and configured for capturing images. In the present embodiment, the image capturing device 500 is fixed on the top surface 110 of the display panel 100 and configured for capturing images, such as a human face.

The multi-angle adjusting device 200 includes a first shell 10, a second shell 20, a holder 30, a first motor 40, a second motor 50, and a third motor 60. The first shell 10 is fixed on the support 310 and the second shell 20 is fixed on the back surface 120 of the display panel 100. Both the first shell 10 and the second shell 20 are hemisphere. In the present embodiment, the inner diameter of the first shell 10 is bigger than the outer diameter of the second shell 20, so the second shell 20 can rotate within the first shell 10. The first shell 10 and the second shell 20 cooperatively define a receiving space (not labeled). The holder 30 is received in the receiving space and divides the receiving space into a top receiving room 201 and a bottom receiving room 101. The first motor 40 is received in the bottom receiving room 101. The motors 50, 60 are received in the top receiving room 201. In this embodiment, the first motor 40 is received in the bottom receiving room 101 adjacent to the support 310, the second and third motors 50 and 60 are received in the top receiving room 201 adjacent to the display panel 100. Because the holder 30, the first motor 40, the second motor 50, and the third motor 60 are all received in the receiving space, the multi-angle adjusting device 200 appears compact. In the present embodiment, the holder 30 is a platform. The first motor 40, the second motor 50, and the third motor 60 are stepper motors.

In the present embodiment, a first axis A, a second axis B, and a third axis C are defined. The direction of the third axis C is perpendicular to the back surface 120 of the display panel 100. The direction of the first axis A, the direction of the second axis B and the direction of the third axis C are perpendicular to each other.

Figure 3:
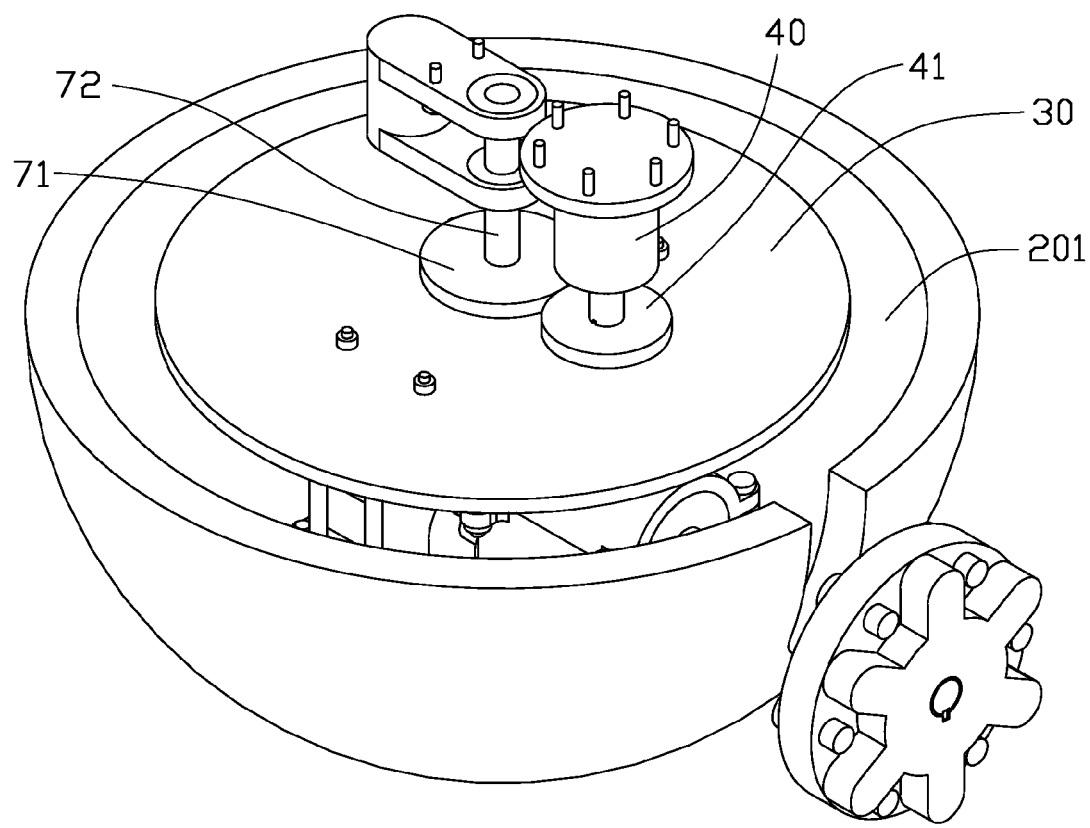
FIG. 3 is a partial schematic view of a first motor and a holder in a first shell of the multi-angle adjustable device of FIG. 2.

The first motor 40 is configured for rotating the holder 30 about the first axis A. The first motor 40 can be fixed on the first shell 10 or the holder 30. In the present embodiment, the first motor 40 is fixed to the first shell 10 by a number of bolts G1. The first motor 40 has a first rotor 40a with a first driving gear 41 secured at an end. The holder 30 has a first rotating shaft 72 with a first driven gear 71 secured at an end, and corresponding to the first rotor 40a and the first driving gear 41 of the first motor 40. The first rotating shaft 72 is received in a first bearing bracket 70. The first bearing bracket 70 is fixed on the first shell 10. The first driven gear 71 is meshed with the first driving gear 41, therefore the first motor 40 can rotate the holder 30. Because the holder 30 is not directly fixed on the first rotor 40a of the first motor 40, the torque of the first motor 40 when rotating is reduced. Referring to FIG. 3, when the holder 30 is rotated by the first motor 40, the display panel 100 can be rotated about the first axis A.

The second motor 50 is configured for rotating the second shell 20 about the second axis B. The second motor 50 can be fixed on the holder 30 or the second shell 20. In the present embodiment, the second motor 50 is fixed on the holder 30 by a number of bolts G2. In the present embodiment, the second motor 50 has a second rotor 50a with a second driving gear 51 secured at an end. The second shell 20 has two pairs connecting legs 84, 85. The two pairs connecting legs 84, 85 are fixed to a second rotating shaft 82. The second rotating shaft 82 has a second driven gear 81. The second rotating shaft 82 is received in a second bearing bracket 80. The second bearing bracket 80 is fixed on the holder 30 using a number of bolts G3. The second driven gear 81 is meshed with the second driving gear 51, therefore the second motor 50 can rotate the second shell 20. Referring the FIG. 4, when the second motor 50 rotates the second driving gear 51, the display panel 100 can rotate about the second axis B.

Figure 4:
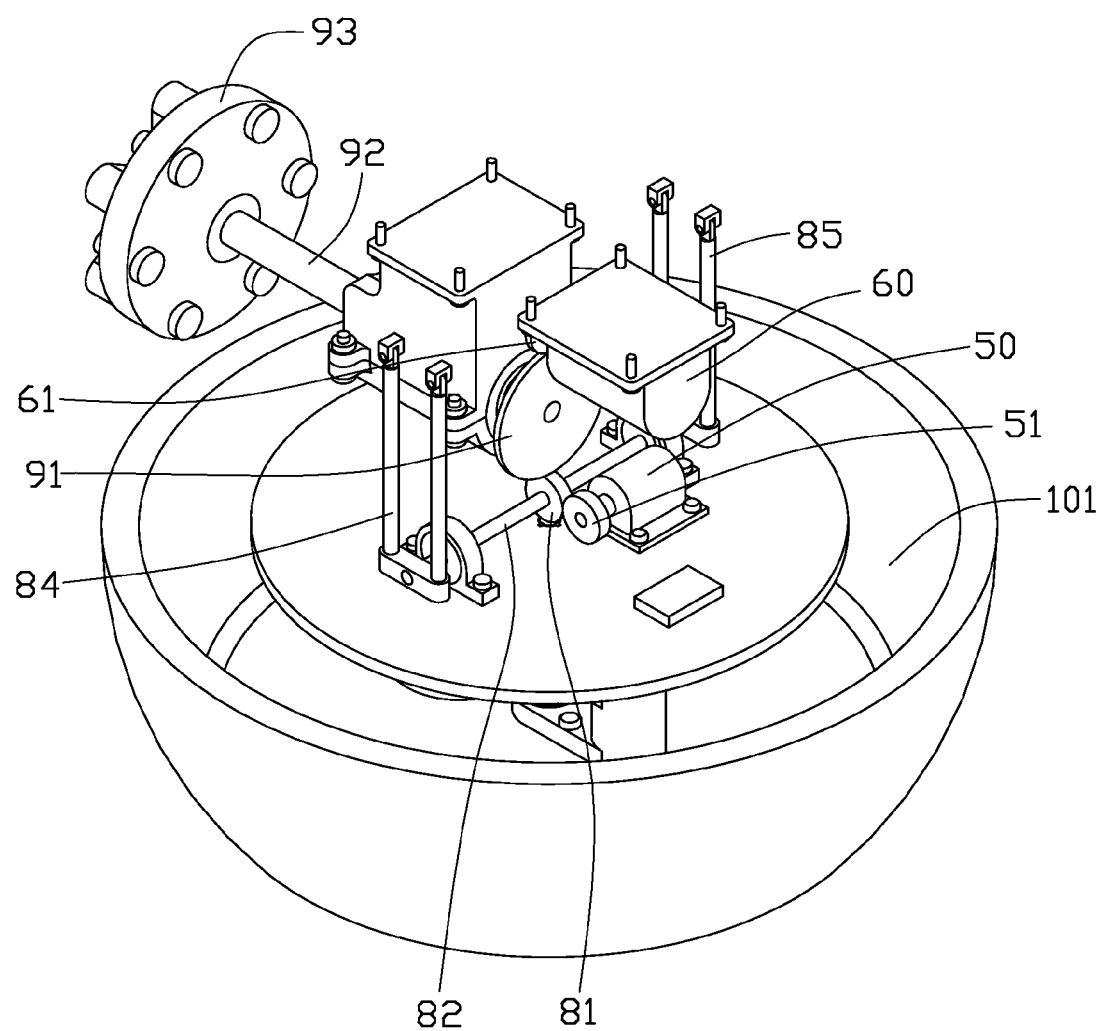
FIG. 4 is a partial schematic view of a second motor, a third motor, and a holder in a second shell of the multi-angle adjustable device of FIG. 2.

The third motor 60 is configured for rotating the display panel 100 about the third axis C relative to the second shell 20. In the present embodiment, the third motor 60 is fixed on the second shell 20 by a number of bolts G4. The third motor 60 has a third rotating shaft (not visible) with a third driving gear 61 secured. The display panel 100 has a fourth rotating shaft 92 with a third driven gear 91 secured. The display panel 100 is connected with the fourth rotating shaft 92 by a flange 93. The flange 93 is fixed on the display panel 100 using a number of bolts G5. The fourth rotating shaft 92 is received in a third bearing bracket 90 fixed on the second shell 20. The third driven gear 91 is meshed with the third driving gear 61, therefore the third motor 60 can rotate the display panel 100 about the third axis C. Because the display panel 100 is not directly fixed on the third rotating shaft of third motor 60, the torque of the third motor 60 when rotating is lessened. Referring to FIG. 4, when the display panel 100 is rotated by the third motor 60, the display panel 100 can be rotated about the third axis C.

Figure 5:
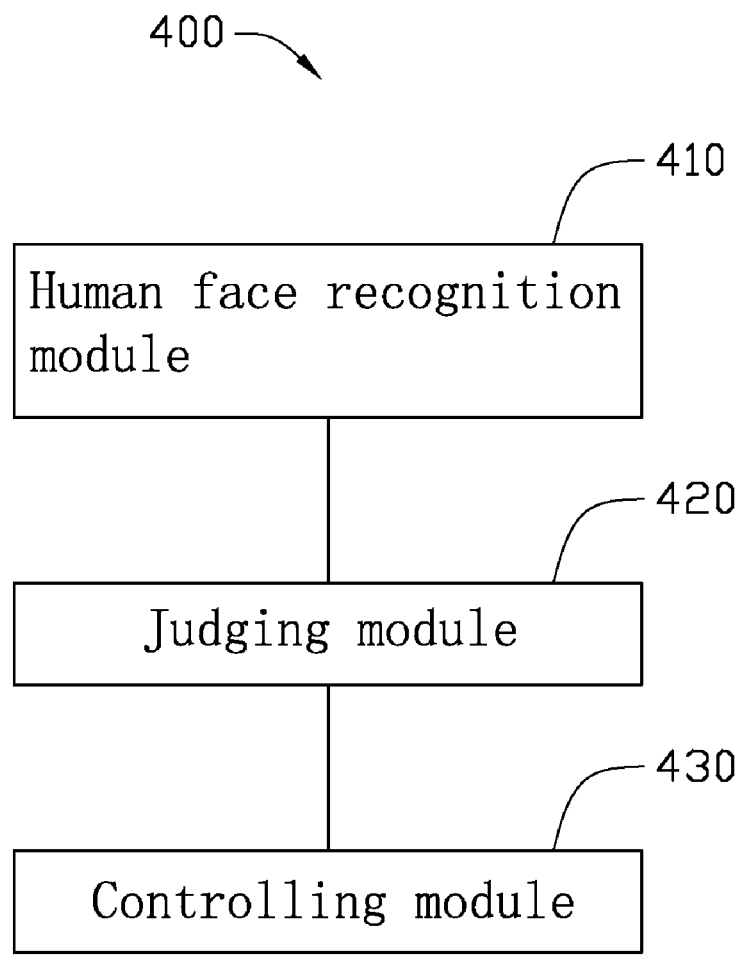
FIG. 5 is a functional block diagram of a controller of the flat panel display device of FIG. 1.

The controller 400 is configured for controlling the first, second and third motors 40, 50 and 60. The controller 400 can be received in the multi-angle adjusting device 200. In the present embodiment, the controller 400 is a chip and mounted on the holder 30 and electrically coupled to the motors 40, 50, 60 correspondingly. Referring to FIG. 5, the controller 400 can be a manual controller or an auto-controller that can automatically control the actions of the motors 40, 50 and 60 based on the image. In the present embodiment, the controller 400 is an auto-controller base on the position of the human face in the image. The controller 400 is electrically coupled to the image capturing device 500. In the present embodiment, the controller 400 includes a human face recognition module 410, a judging module 420, and a controlling module 430.

The human face recognition module 410 is configured for identifying a human face as an object in the image captured by the image capturing device 500 with a face recognition program. The judging module 420 is configured for detecting the position of the object in the image. In the present embodiment, the judging module 420 defines the center of the image as a reference position. When the object (human face) in the image moves up or down from the reference position, the judging module 420 outputs a first signal or a second signal to the controlling module 430. When the human face in the image moves left or right of the reference position, the judging module 420 sends a third signal or a fourth signal to the controlling module 430. When the object wiggles clockwise or counterclockwise around the third axis C, the judging module 420 sends a fifth signal or a sixth signal to the controlling module 430.

The controlling module 430 is configured for controlling the first motor 40, the second motor 50, or the third motor 60 based on the output from the judging module 420 so as to adjust an orientation of the display panel 100. In the present embodiment, when the controlling module 430 receives the first signal or the second signal, the controlling module 430 will drive the first motor 40 to rotate the display panel 100 about the first axis A. When the controlling module 430 receives the third signal or the fourth signal, the controlling module 430 will drive the second motor 50 to rotate the display panel 100 about the second axis B. When the controlling module 430 receives the fifth signal or the sixth signal, the controlling module 430 will drive the third motor 60 rotate the display panel 100 along clockwise or counterclockwise around the third axis C. The controller 400 can also work based on signals given by the hand.

The controller 400 can further identify a hand signal as an object. When the controller 400 recognizes the hand signal in the image, the controller 400 will drive different motors by the different signals given by the hand. For example, if the controller 400 recognizes a left pointing hand signal, the controller 400 will drive the first motor 40 to rotate the display panel 100 around the first axis A. Such that, the flat panel display device 1 can achieve multi-angle adjusting conveniently.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A flat panel display device comprising:
a display panel;
a stand; and
a multi-angle adjusting device comprising:
a first shell fixed on the stand;
a second shell being rotatably connected with the first shell, and cooperatively defining a receiving space with the first shell;
a holder received in the receiving space;
a first motor received in the receiving space and connected between the first shell and the holder, the first motor being configured for rotating the holder about a first direction along the stand;
a second motor received in the receiving space and connected between the holder and the second shell, the second motor being configured for moving the second shell about a second direction perpendicular to the first direction relative to the first shell; and
a third motor partially received in the receiving space and connected between the second shell and the display panel, the third motor being configured for rotating the display panel about a third direction which is perpendicular to the first and second directions.

2. The flat panel display device as claimed in claim 1, wherein the first shell and the second shell are hemisphere.

3. The flat panel display device as claimed in claim 1, wherein the first motor is fixed on the first shell or the holder.

4. The flat panel display device as claimed in claim 3, wherein the second motor fixed on the holder or the second shell.

5. The flat panel display device as claimed in claim 4, wherein the third motor fixed on the second shell.

6. The flat panel display device as claimed in claim 1, wherein the flat panel display device also comprises a controller, the controller configured for controlling the first motor, the second motor, and the third motor.

7. The flat panel display device as claimed in claim 6, wherein the controller is a manual controller.

8. The flat panel display device as claimed in claim 6, wherein the flat panel display device also comprises an image capturing device fixed on the display panel and configured for capturing images, and the controller comprises:
a human face recognition module configured for recognizing a human face in an image captured by the image capturing device;
a judging module configured for judging the location of the human face in the image, and sending different signals; and a controlling module configured for controlling the first motor, the second motor, the third motor base on the signals outputted from the judging module to rotate the display panel.

9. The flat panel display device as claimed in claim 6, wherein the flat panel display device also comprises s an image capturing device, the controller recognizing signals from a hand in an image captured by the image capturing device, and controlling the first motor, the second motor, the third motor base on the signals of the hand.

10. The flat panel display device as claimed in claim 1, wherein the stand comprises a support and a base, and the support is connected with the multi-angle adjusting device.

11. The flat panel display device as claimed in claim 1, wherein the inner diameter of the first shell is bigger than the outer diameter of the second shell.

12. The flat panel display device as claimed in claim 1, wherein the display panel comprises a back surface, and the third direction is perpendicular to the back surface of the display panel.

* * * * *